United States Patent Office.

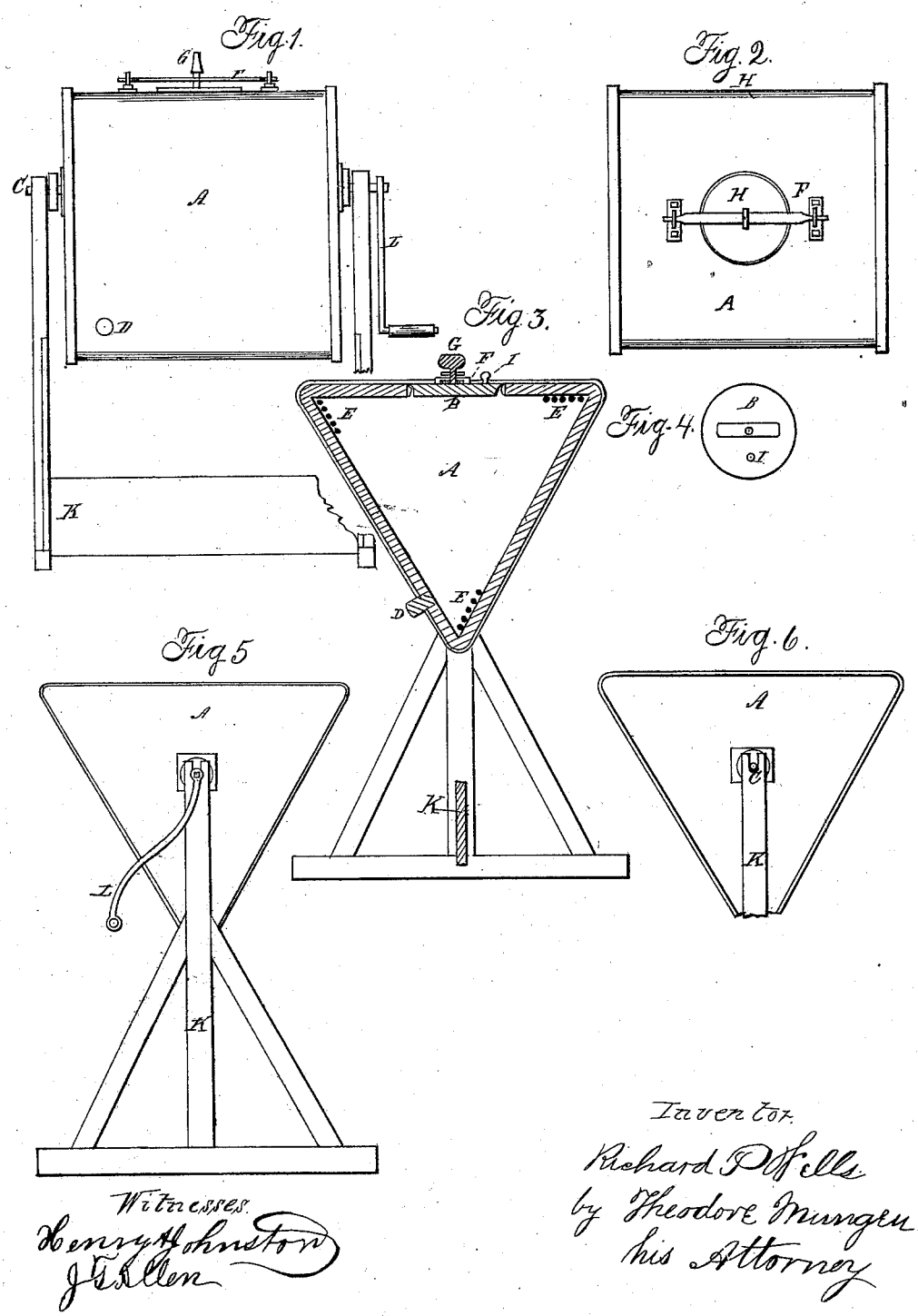

RICHARD P. WELLS, OF DAYTON, OHIO, ASSIGNOR TO HIMSELF AND JOHN P. COMLY, OF SAME PLACE.

Letters Patent No. 99,612, dated February 8, 1870.

IMPROVEMENT IN CHURNS.

The Schedule referred to in these Letters Patent and making part of the same.

*To all whom it may concern:*

Be it known that I, RICHARD P. WELLS, of the city of Dayton, county of Montgomery, and State of Ohio, have invented a new and useful machine for the manufacture, washing, and salting of butter, and the cleansing of clothing, which I denominate and style "The Combined Churn and Washer;" and I do verily believe that the following is a full, clear, and exact description of the construction and operation of the same, reference being had to the annexed drawing, making a part of this specification.

The nature of my invention consists in the formation or manufacture of a triangular, square, or any other irregular-shaped box, having abrupt corners, and placing journals in the centre of each end. Then mounting the whole on suitable bearings, having a crank or pulley attached to the journal at one end, the box is made to revolve, and this process of revolution creates a hydraulic or surging motion, which converts the cream into butter, or, as the case may be, cleanses the clothing placed therein.

By reference to the accompanying drawing it will be found that

Figure 1, A, represents the sides;
Figure 2, A, the top; and
Figures 5 and 6, A, the ends.

H, fig. 2, is the aperture through which the cream is introduced for the purpose of converting it into butter, or the clothes are passed preparatory to washing.

B, Figure 4, is the lid, which is lined on its edges with gum cloth, and is firmly secured to the aperture or opening by means of a steel bar, held by staples at each end, passing over it, (see figs. 1, 2, and 3,) and adjusted so as to render the box water and steam-tight, by the use of the temper-screw G, figs. 1 and 3, thereby preventing the leakage of cream or water from the machine, and maintaining, while in use as a washer, a high degree of heat.

In each angle or corner of the revolving box are placed five one-inch rollers, E E E, Figure 3, which are designed to add to its efficiency as a washing-machine.

The opening D, figs. 1 and 3, is a hole one inch in diameter, which is closed with a plug when the machine is in use, and opened for the purpose of drawing off butter-milk or water, when it is desired to empty or cleanse the machine.

The small opening at C, figs. 1 and 6, is a hole in the end of the journal communicating with the interior of the churn and washer, designed for the purpose of admitting steam, to facilitate the operation of washing clothing.

I, fig. 4, is the hook or knob by which the lid is raised from the opening H.

L, figs. 1 and 5, is the crank and handle by which the churn and washer is made to revolve, when mounted on the frame K, figs. 1, 3, and 5.

The whole machine is substantially made by tonguing and grooving the sides and ends together, and securing them by means of a shrunken band of heavy box-iron on each end.

Now, what I desire to secure by Letters Patent, is—

The equilateral triangular box A, provided with rollers E, plug D, and lid B, having bar F, screw G, and hook I, when supported in bearings K by journals, one of which has the hole C, as and for the purpose hereinbefore specified.

RICHARD P. WELLS.

Witnesses:
JOHN P. COMLY,
JAS. C. YOUNG.